(12) United States Patent
Fukushima

(10) Patent No.: US 9,209,451 B2
(45) Date of Patent: Dec. 8, 2015

(54) LITHIUM RECHARGEABLE BATTERY COMPRISING A LITHIUM TITANATE SINTERED BODY

(75) Inventor: Takaaki Fukushima, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 320 days.

(21) Appl. No.: 13/819,302

(22) PCT Filed: Dec. 17, 2011

(86) PCT No.: PCT/JP2011/079259
§ 371 (c)(1),
(2), (4) Date: Feb. 26, 2013

(87) PCT Pub. No.: WO2012/086557
PCT Pub. Date: Jun. 28, 2012

(65) Prior Publication Data
US 2013/0157137 A1    Jun. 20, 2013

(30) Foreign Application Priority Data

Dec. 24, 2010  (JP) .................................. 2010-288124

(51) Int. Cl.
*H01M 4/48* (2010.01)
*H01M 4/36* (2006.01)
(Continued)

(52) U.S. Cl.
CPC .............. *H01M 4/131* (2013.01); *H01M 4/485* (2013.01); *H01M 10/052* (2013.01); *H01M 10/0585* (2013.01); *Y02E 60/122* (2013.01); *Y02T 10/7011* (2013.01)

(58) Field of Classification Search
CPC . H01M 4/131; H01M 4/485; H01M 10/0565; H01M 10/052

USPC .............. 429/231.1, 324, 209, 223, 123, 246; 180/65.1

See application file for complete search history.

(56) References Cited

U.S. PATENT DOCUMENTS

2007/0284159 A1* 12/2007 Takami et al. ............... 180/65.1
2009/0169997 A1*  7/2009 Saruwatari et al. ........... 429/221
(Continued)

FOREIGN PATENT DOCUMENTS

EP       1 057 783 A2    12/2000
JP       2001-192208      7/2001
(Continued)

OTHER PUBLICATIONS

T. Pereira et al., "The performance of thin-film Li-ion batteries under flexural deflection" J. Micromech. Microeng., vol. 16, pp. 2714-2721, 2006.
(Continued)

*Primary Examiner* — Kenneth Douyette
(74) *Attorney, Agent, or Firm* — Volpe and Koenig, P.C.

(57) ABSTRACT

A lithium rechargeable battery having a nonaqueous electrolyte held between a positive electrode and a negative electrode is provided. The lithium rechargeable battery has a high energy density and a high battery capacity by enhancing a filling factor of an active material of the positive electrode or the negative electrode. In the lithium rechargeable battery includes the positive electrode, the negative electrode, and the nonaqueous electrolyte held between the positive electrode and the negative electrode, the positive electrode or the negative electrode is comprised of a lithium titanate sintered body. The lithium titanate sintered body has a mean fine pore diameter of 0.10 to 0.20 μm, a specific surface area of 1.0 to 3.0 $m^2/g$, and a relative density of 80 to 90%.

8 Claims, 1 Drawing Sheet

(51) Int. Cl.
  H01M 4/131 (2010.01)
  H01M 4/485 (2010.01)
  H01M 10/052 (2010.01)
  H01M 10/0585 (2010.01)

(56) References Cited

U.S. PATENT DOCUMENTS

2010/0099030 A1\* 4/2010 Nishida et al. ............... 429/324
2011/0189545 A1 8/2011 Holzapfel et al.
2014/0209834 A1 7/2014 Holzapfel et al.

FOREIGN PATENT DOCUMENTS

| | | |
|---|---|---|
| JP | 2002-042785 | 2/2002 |
| JP | 2002-289194 | 10/2002 |
| JP | 2011521881 A | 7/2011 |
| WO | WO 2012/002122 A1 | 1/2012 |

OTHER PUBLICATIONS

Korean language office action dated Jul. 30, 2014 and its English language Statement of Relevance of Non-English References Pursuant to 37 CFR 1.98(a)(3)(i).

\* cited by examiner

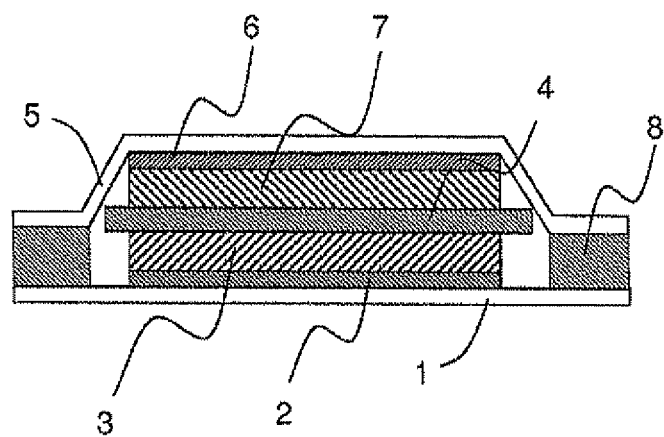

LITHIUM RECHARGEABLE BATTERY COMPRISING A LITHIUM TITANATE SINTERED BODY

TECHNICAL FIELD

The present invention relates to a high-capacity and high-power lithium rechargeable battery.

BACKGROUND ART

Recently, rechargeable batteries have found their way into electric vehicle batteries as well as portable telephones and notebook PCs. Several techniques for achieving sufficient electronic conductivity by making electrodes only from an active material have been proposed in these batteries. For example, patent document 1 has achieved electrodes with sufficient electronic conductivity having a relative density ranging from 50 to 80% in the following manner. That is, fired powder as an active material is converted into slurry by adding forming additives, plasticizer, dispersing agent and solvent to the fired powder. The slurry is applied to a polyethylene terephthalate (PET) film by a doctor blade method, followed by punching to a predetermined size and heat treatment.

PRIOR ART DOCUMENT

Patent Document 1: Japanese Unexamined Patent Publication No. 2002-042785

SUMMARY OF THE INVENTION

Problems to be Solved by the Invention

However, in the electrodes as described in the patent document 1, the utilization factor of the active material is reduced to 80% or less when a filling factor of the active material is in the range of 80% or more. Therefore, the effect of the electrodes is small and insufficient from the viewpoints of improving battery energy density and battery capacity.

The present invention has been proposed under the above-described circumstances. It is therefore an object of the present invention to provide a lithium rechargeable battery having higher energy density and higher battery capacity.

Means for Solving the Problem

A lithium rechargeable battery of the present invention includes a positive electrode, a negative electrode, and a nonaqueous electrolyte held between the positive electrode and the negative electrode. The positive electrode or the negative electrode is composed of a lithium titanate sintered body. The lithium titanate sintered body has a mean fine pore diameter of 0.10 to 0.20 µm, a specific surface area of 1.0 to 3.0 m$^2$/g, and a relative density of 80 to 90%.

Effect of the Invention

The lithium rechargeable battery of the present invention employs the lithium titanate sintered body having the mean fine pore diameter of 0.10 to 0.20 µm, the specific surface area of 1.0 to 3.0 m$^2$/g, and the relative density of 80 to 90%, as the positive electrode or the negative electrode. This allows the lithium rechargeable battery with high energy density and excellent charge-discharge characteristics.

BRIEF DESCRIPTION OF THE DRAWINGS

FIG. 1 is a cross-sectional view of a lithium rechargeable battery according to an embodiment of the present invention.

PREFERRED EMBODIMENTS FOR CARRYING OUT THE INVENTION

FIG. 1 is the sectional view of the lithium rechargeable battery according to the embodiment of the present invention, which illustrates that a separator 4 containing a nonaqueous electrolyte is held between a pair of electrodes composed of a positive electrode 3 and a negative electrode 7. The cathode can 1 has the positive electrode 3 attached thereto with the cathode current collector 2 interposed therebetween. The anode can 5 has the negative electrode 7 attached thereto with the anode current collector 6 interposed therebetween. The cathode can 1 and the anode can 5 are fastened to each other, and are sealed together with the insulation packing 8 interposed therebetween.

The cathode current collector 2 or the anode current collector 6 is disposed for the current collection by the positive electrode 3 or the negative electrode 7. For example, the cathode current collector 2 and the anode current collector 6 are made of a mixture of a conductive filler and polymer adhesive. The conductive filler is composed of at least one kind selected from carbon black, graphite, gold, silver, nickel, zinc oxide, tin oxide, indium oxide, titanium oxide, and potassium titanate. The polymer adhesive is composed of at least one kind selected from acrylic resin, epoxy resin, silicon resin, polyimide resin, phenol resin, polyester resin and polyimide resin.

The positive electrode 3 or the negative electrode 7 is composed of a lithium titanate sintered body having a mean fine pore diameter of 0.10 to 0.20 µm, a specific surface area of 1.0 to 3.0 m$^2$/g, and a relative density of 80 to 90%.

In the lithium rechargeable battery of the present invention, the lithium titanate sintered body having the relative density of 80 to 90% is used as the positive electrode 3 or the negative electrode 7. This allows an active material to be tightly filled, thereby achieving the lithium rechargeable battery with high energy density and excellent charge-discharge characteristics.

The lithium titanate sintered body constituting the positive electrode 3 or the negative electrode 7 is configured to have a mean fine pore diameter of 0.10 to 0.20 µm, and a specific surface area of 1.0 to 3.0 m$^2$/g. This allows electrolyte to be sufficiently impregnated into the lithium titanate sintered body, thereby ensuring a contact area between the electrolyte and the electrode active material. This also allows the relative density of the lithium titanate sintered body to be improved to 80% or more, thereby enhancing the filling density of the active material.

When the mean fine pore diameter is less than 0.10 µm, or the specific surface area is more than 3.0 m$^2$/g, it is difficult to increase the relative density of the lithium titanate sintered body to 80% or more, thus failing to enhance the energy density.

When the mean fine pore diameter is more than 0.20 µm, or the specific surface area is less than 1.0 m$^2$/g, the relative density exceeds 90% and the energy density is enhanced. However, this makes it difficult for the electrolyte to impregnate into the lithium titanate sintered body, and the contact area between the electrolyte and the electrode active material is decreased, thus causing a considerable voltage drop during charge-discharge.

The mean grain size of grains constituting the lithium titanate sintered body is preferably 0.5 µm or less. By setting the mean grain size at 0.5 µm or less, a Li ion diffusion distance within the grains can be shortened so as to reduce resistance to ionic conductivity. Furthermore, by setting the mean grain size at 0.5 µm or less, it becomes easier to maintain the mean fine pore diameter, the specific surface area and the relative density within the above-mentioned ranges. If the mean grain size exceeds 0.5 µm, a discharge potential might be lowered.

The mean fine pore diameter of the lithium titanate sintered body may be measured by mercury intrusion porosimetry. The specific surface area thereof can be calculated from a volume of absorbed gas of the sintered body measured by gas absorption method. The relative density may be calculated from a density of the sintered body measured by Archimedes method, and the theoretical density of $Li_4Ti_5O_{12}$, namely, 3.48 g/cm$^3$. The mean grain size of the grains constituting the lithium titanate sintered body may be found by, for example, heat treating a fracture surface of the sintered body, and by performing image analysis of a photograph of the fracture surface taken with a scanning electron microscope (SEM).

The thickness of the positive electrode 3 or the negative electrode 7 composed of the lithium titanate sintered body is preferably 20 µm to 200 µm. This ensures an absolute quantity of the active material necessary for improving the battery energy density and the battery capacity. Furthermore, by having the thickness of 20 µm to 200 µm, charge-discharge characteristics are excellent, and an electrode that has excellent handling properties and is easy to handle is obtained.

Bending strength is preferably 50 MPa or more in terms of handling properties. The bending strength can be measured by four-point bending method or three-point bending method according to JIS R 1601. Alternatively, converted strength on the basis of a sample size may be used.

Further, the lithium titanate sintered body contains at least one kind of rutile-type titanium oxide crystal grains and anatase-type titanium oxide crystal grains. Either one of peak intensity of a (110) plane of the rutile-type titanium oxide and peak intensity of a (101) plane of the anatase-type titanium oxide crystal has higher intensity, and X-ray diffraction peak intensity of the one having the higher peak intensity is preferably 1.5% or less with respect to peak intensity of a (111) plane of $Li_4Ti_5O_{12}$ crystal that is obtained by an X-ray diffraction method (XRD).

In order to obtain an X-ray diffraction peak intensity ratio, peak intensity of the sintered body is measured by the X-ray diffraction method using Cu—Kα ray. Then, a peak intensity ratio $I_T/I_{LT}$ can be calculated from peak intensity ($I_{LT}$) of the (111) plane of the $Li_4Ti_5O_{12}$ crystal in the vicinity of a diffraction angle 2θ of 18.3°, and peak intensity ($I_T$) of either one of the (110) plane of the rutile-type titanium oxide crystal in the vicinity of a diffraction angle 2θ of 27.4° and the (101) plane of the anatase-type titanium oxide crystal in the vicinity of a diffraction angle 2θ of 25.3°. The phrase "in the vicinity of the diffraction angle 2θ of 18.3°" denotes being in an error range of ±0.3°. Hereinafter, when the phrase "in the vicinity of" is used related to the diffraction angle 2θ, it denotes the error range of ±0.3°.

The lithium titanate ($Li_4Ti_5O_{12}$) can be synthesized by mixing and firing, for example, lithium hydroxide and titanium dioxide. However, the synthesized product with a small crystal grain size is apt to contain rutile-type titanium oxide, anatase-type titanium oxide, $Li_2TiO_3$, or the like as impurity phases. These crystal phases are inert or have a small battery capacity, and consequently reduce an effective capacity of the lithium rechargeable battery configured to use the lithium titanate sintered body as the negative electrode. In order to prevent deterioration of the effective capacity of the lithium rechargeable battery, in the $Li_4Ti_5O_{12}$ sintered body serving as the positive electrode 3 or the negative electrode 7, an XRD peak intensity ratio of the $Li_4Ti_5O_{12}$ crystal and the rutile-type titanium oxide and the anatase-type titanium oxide is preferably in the above-mentioned range.

When the lithium titanate sintered body is used for the negative electrode 7, examples of the active material used for the positive electrode 3 are included lithium cobalt composite oxide, lithium manganese composite oxide, manganese dioxide, lithium nickel composite oxide, lithium nickel cobalt composite oxide, lithium vanadium composite oxide, and vanadium oxide.

In this case, similarly to the negative electrode 7, the positive electrode 3 is preferably the sintered body having a mean fine pore diameter of 0.10 to 0.20 µm, a specific surface area of 1.0 to 3.0 m$^2$/g, and a relative density of 80 to 90%.

Alternatively, when the lithium titanate sintered body is used for the positive electrode 3, examples of the active material used for the negative electrode 7 are included carbon materials, such as graphite, hard carbon and soft carbon, Li, and alloys allowing for Li insertion and extraction.

The electrodes composed of the lithium titanate sintered body may be manufactured with any one of the following methods (1) to (3).

(1) Slurry is prepared by mixing raw material powder of lithium titanate with water or solvent to which forming additives are added as well as a dispersing agent and plasticizer as required. The slurry is applied to a base film and is dried. The slurry is then peeled out of the base film, followed by sintering.

(2) Raw material powder of lithium titanate is directly used. If necessary, the raw material powder is granulated. The raw material or the granulated raw material is loaded into a mold and is subjected to press forming by a press machine, followed by sintering.

(3) Granulated raw material powder of lithium titanate is subjected to press forming by a roll press machine. This is then shaped into a sheet, followed by sintering.

The granulation in the methods (2) and (3) may be wet granulation in which the granulation is carried out using the slurry described in the method (1) or dry granulation.

Examples of the forming additives are included polyacrylic acid, carboxymethyl cellulose, polyvinylidene fluoride, polyvinyl alcohol, diacetyl cellulose, hydroxypropyl cellulose, polyvinylchloride, polyvinylpyrrolidone, and butyral. These may be used singly or as a mixture of two or more kinds selected from them.

Some examples of the base film are included resin films made from polyethylene terephthalate, polypropylene, polyethylene, or tetrafluoroethylene.

A firing temperature needs to be suitably selected in a range of 700 to 900° C. according to sintering properties of the raw material powder. Although a fine lithium titanate raw material contains approximately 1% by mass of titanium oxide as unavoidable impurities, the decomposition of lithium titanate during firing can be suppressed to prevent the increase in the amount of impurities by setting the firing temperature at a low temperature of 900° C. or less, preferably 800° C. or less. When the firing temperature is higher than 900° C., titanium oxide is generated as a different phase due to the decomposition of the lithium titanate, thus deteriorating the electrode characteristics.

As raw material powder of lithium titanate, fine powder ($Li_4Ti_5O_{12}$) having a specific surface area of 20 m$^2$/g or more and a primary particle diameter of 0.1 µm or less is preferably used. Further, when slurrying is carried out in a manufacturing step, it is preferable to use fine powder having a specific surface area of 20 to 50 m²/g, and a primary particle diameter of 0.05 to 0.1 μm. Using these fine powders contributes to a smaller fine pore diameter and a larger specific surface area after sintering, and also allows for low-temperature densification, thereby obtaining a dense sintered body free from the different phase.

A preferred binder is butyral-based binder. The butyral-based binder has high strength, and therefore the amount of addition thereof can be decreased to produce a high density sintered body. The amount of the binder is preferably 10% by volume or less with respect to the active material.

Examples of organic solvent used for an organic electrolyte are included ethylene carbonate, propylene carbonate, butylene carbonate, γ-butyrolactone, sulfolane, 1,2-dimethoxyethane, 1,3-dimethoxypropane, dimethyl ether, tetrahydrofuran, 2-methyltetrahydrofuran, dimethyl carbonate, diethyl carbonate, and methyl ethyl carbonate. These may be used singly or as solvent obtained by mixing two or more kinds selected from them. Examples of electrolyte salt are included lithium salts, such as $LiClO_4$, $LiBF_4$, $LiPF_6$, $LiCF_3SO_3$, $LiN(CF_3SO_2)_2$, and $LiN(C_2F_5SO_2)_2$.

As the separator 4, a nonwoven fabric made from polyolefin fibers, and a microporous membrane made from polyolefin fibers can be used. Examples of the polyolefin fibers are included polyethylene fibers and polypropylene fibers.

The cathode can 1 has the positive electrode 3 attached thereto with the cathode current collector 2 interposed therebetween. The anode can 5 has the negative electrode 7 attached thereto with the anode current collector 6 interposed therebetween. The cathode can 1 and the anode can 5 are fastened to each other, and are sealed together with the insulation packing 8 interposed therebetween.

The shape of the lithium rechargeable battery of the present invention is not limited to rectangular type, cylindrical type, button type, coin type, flat type, or the like.

The lithium rechargeable battery of the present invention is configured to be densely filled with the active material, and thus has a high energy density and excellent charge-discharge characteristics by employing the sintered body with the relative density of 80 to 90% as the positive electrode 3 or the negative electrode 7.

In the case of an oxide-based active material, electronic conduction additives need to be added to retain conductivity in a normal usage. On the other hand, in the lithium rechargeable battery of the present invention, the dense sintered body of active material serves as the positive electrode 3 or the negative electrode 7. This contributes to an increase in the contact area between the active material particles, thus obtaining sufficient electronic conductivity without using the electronic conduction additives.

When the electrode serving as the positive electrode 3 or the negative electrode 7 is densified, the electrolyte impregnation into the electrode and the interface between the electrolyte and the active material are decreased to cause the deterioration of the charge-discharge characteristics. However, by setting the mean fine pore diameter of the electrode at 0.10 to 0.20 μm, and the specific surface area at 1.0 to 3.0 m²/g, the electrolyte impregnation into the electrode and the interface between the electrolyte and the active material can be ensured, thereby producing the electrode that can achieve both the high energy density and the excellent charge-discharge characteristics.

In the case of using the sintered body electrode, the expansion and contraction of the electrode due to charge-discharge become a major problem. However, the expansion and contraction due to charge-discharge can be reduced by using the $Li_4Ti_5O_{12}$ for the active material.

EXAMPLES

Slurry was prepared by adding forming additives, plasticizer, dispersing agent and solvent to a raw material of $Li_4Ti_5O_{12}$ having a specific surface area of 35 m²/g, a mean particle diameter of 0.1 μm, and an impurity content of 0.8%. The phrase "impurity content" denotes an $I_T/I_{LT}$ in the X-ray diffraction of raw material powder. The slurry was applied to a polyethylene terephthalate (PET) film by the doctor blade method, and was then dried, thereby manufacturing a green sheet having a thickness of 55 to 65 μm. The green sheet was punched out a circular shape so as to have a diameter of 15 mm as a size after firing. This was fired in the atmosphere at temperatures as illustrated in Table 1.

All the resultant lithium titanate sintered bodies had a thickness of 50 μm, and their mean fine pore diameter, BET specific surface area, relative density, bending strength and mean grain size were measured. The results were illustrated in Table 1. An XRD peak intensity ratio $I_T/I_{LT}$ of an $Li_4Ti_5O_{12}$ crystal and a titanium oxide crystal was calculated from peak intensity of the lithium titanate sintered body measured by the X-ray diffraction method using Cu—Kα ray, in which either one of the (110) plane of the rutile-type titanium oxide crystal and the (101) plane of the anatase-type titanium oxide crystal has higher intensity, and is taken as $I_T$. The obtained $I_T/I_{LT}$ values were illustrated in Table 1.

The mean fine pore diameter was measured by mercury intrusion porosimetry. As the specific surface area, a BET surface area was calculated by measuring an amount of absorbed gas of the sintered body by gas absorption method. The relative density was calculated from a density of the sintered body measured by the Archimedes method, and the theoretical density of $Li_4Ti_5O_{12}$, namely, 3.48 g/cm³. The bending strength was measured by the four-point bending method according to JIS R 1601.

The mean grain size of the grains constituting the sintered body was calculated by taking a cross-section photograph of a heat-treated fracture surface of the sintered body with a scanning electron microscope (SEM), and by performing image analysis on an area of 10×10 μm with 20000 magnification.

Further, a working electrode having each of the resultant sintered bodies adhered to a metal-plate current collector with conductive adhesive, and a counter electrode having a Li metal foil firmly pressed against a metal-plate current collector were opposed to each other with a separator interposed therebetween, thereby assembling a battery cell. The separator was a polyethylene nonwoven fabric impregnated with an organic electrolyte. The organic electrolyte was obtained by dissolving lithium hexafluorophosphate ($LiPF_6$) into solvent obtained by mixing ethylene carbonate (EC) and dimethyl carbonate (DMC) at a volume ratio of 3:7. In the organic electrolyte, a concentration of $LiPF_6$ was 1 mol/L.

The battery cells thus manufactured were subjected to a charge-discharge test at a current value corresponding to 10-hour rate. A charge cutoff voltage was set at 2.5 V, and a discharge cutoff voltage was set at 0.4 V.

All the battery cells had an active material utilization factor of 100%. A battery capacity per unit volume of each of the sintered bodies used for the working electrode was calculated using an actual measured capacity. The results thereof were illustrated in Table 1.

TABLE 1

| Sample No. | Firing Temperature °C. | Mean Fine Pore Diameter μm | Specific Surface Area m²/g | Relative Density % | Bending Strength MPa | Mean Grain Size μm | $I_T/I_{LT}$*1 % | Active Material Utilization Factor % | Discharge Potential V | Battery Capacity mAh/cm³ |
|---|---|---|---|---|---|---|---|---|---|---|
| 1 | 700 | 0.09 | 18.8 | 67 | 36 | 0.10 | 0.8 | 100 | 1.55 | 396 |
| 2 | 750 | 0.09 | 4.2 | 76 | 46 | 0.18 | 0.8 | 100 | 1.55 | 450 |
| 3 | 780 | 0.10 | 3.0 | 80 | 48 | 0.22 | 0.7 | 100 | 1.55 | 473 |
| 4 | 800 | 0.12 | 2.5 | 80 | 50 | 0.25 | 0.8 | 100 | 1.55 | 473 |
| 5 | 800 | 0.14 | 2.2 | 84 | 53 | 0.29 | 0.9 | 100 | 1.55 | 497 |
| 6 | 830 | 0.17 | 1.5 | 87 | 60 | 0.41 | 1.2 | 100 | 1.55 | 514 |
| 7 | 850 | 0.20 | 1.0 | 90 | 66 | 0.53 | 1.6 | 100 | 1.55 (0.6)*2 | 526 |
| 8 | 900 | 18.0 | 0.2 | 91 | 74 | 0.60 | 1.6 | 100 | 0.6 | 538 |

*1 $I_T$ represents the X-ray diffraction peak intensity of either one of an X-ray diffraction peak showing a (110) plane of the rutile-type $TiO_2$ crystal and a (101) plane of the anatase-type $TiO_2$ crystal has higher intensity.
$I_{LT}$ represents the X-ray diffraction peak intensity of a (111) plane of $Li_4Ti_5O_{12}$ crystal,
*2 The number in parenthesis shows the discharge potential at the end of discharge (the amount of discharge is in a range of approximately 90 to 100%).

As illustrated in Table 1, Samples Nos. 3 to 7 have an excellent active material utilization factor and a large battery capacity of 470 mAh/cm³ or more. In Sample No. 7, however, the discharge potential thereof was lowered to 0.6 V at the end of discharge (during which the amount of discharge was in a range of approximately 90 to 100%), and the characteristics thereof were somewhat degraded. On the other hand, Samples Nos. 1 and 2 had a low filling factor of the active material, and hence their battery capacity per volume was as small as 450 mAh/cm³ or less, thus resulting in low strength and poor handling properties. Sample No. 8 had poor battery characteristics because the organic electrolyte was not sufficiently impregnated into the electrode, and the potential during discharge was approximately 0.6 V.

DESCRIPTION OF REFERENCE NUMERALS

1: cathode can, 2: cathode current collector, 3: positive electrode, 4: separator, 5: anode can, 6: anode current collector, 7: negative electrode, and 8: insulation packing

The invention claimed is:
1. A lithium rechargeable battery, comprising:
a positive electrode;
a negative electrode; and
a nonaqueous electrolyte held between the positive electrode and the negative electrode, wherein
the positive electrode or the negative electrode is comprised of a lithium titanate sintered body, and
the lithium titanate sintered body has a mean fine pore diameter of 0.10 to 0.20 μm, a specific surface area of 1.0 to 3.0 m2/g, and a relative density of 80 to 90%.
2. The lithium rechargeable battery according to claim 1, wherein a mean grain size of grains constituting the lithium titanate sintered body is 0.5 μm or less.
3. The lithium rechargeable battery according to claim 1, wherein bending strength of the lithium titanate sintered body is 50 MPa or more.
4. The lithium rechargeable battery according to claim 2, wherein bending strength of the lithium titanate sintered body is 50 MPa or more.
5. The lithium rechargeable battery according to claim 1, wherein the lithium titanate sintered body contains at least one kind of titanium oxide crystal grains having a rutile-type crystal structure and titanium oxide crystal grains having an anatase-type crystal structure, and
in an X-ray diffraction pattern of the lithium titanate sintered body, either one of an X-ray diffraction peak showing a (110) plane of the rutile-type crystal structure of a titanium oxide crystal, and an X-ray diffraction peak showing a (101) plane of the anatase-type crystal structure of a titanium oxide crystal has higher intensity, and the higher intensity of the X-ray diffraction peak is 1.5% or less with respect to intensity of an X-ray diffraction peak showing a (111) plane of Li4Ti5O12 crystal.
6. The lithium rechargeable battery according to claim 2, wherein
the lithium titanate sintered body contains at least one kind of titanium oxide crystal grains having a rutile-type crystal structure and titanium oxide crystal grains having an anatase-type crystal structure, and
in an X-ray diffraction pattern of the lithium titanate sintered body, either one of an X-ray diffraction peak showing a (110) plane of the rutile-type crystal structure of a titanium oxide crystal, and an X-ray diffraction peak showing a (101) plane of the anatase-type crystal structure of a titanium oxide crystal has higher intensity, and the higher intensity of the X-ray diffraction peak is 1.5% or less with respect to intensity of an X-ray diffraction peak showing a (111) plane of Li4Ti5O12 crystal.
7. The lithium rechargeable battery according to claim 3, wherein the lithium titanate sintered body contains at least one kind of titanium oxide crystal grains having a rutile-type crystal structure and titanium oxide crystal grains having an anatase-type crystal structure, and
in an X-ray diffraction pattern of the lithium titanate sintered body, either one of an X-ray diffraction peak showing a (110) plane of the rutile-type crystal structure of a titanium oxide crystal, and an X-ray diffraction peak showing a (101) plane of the anatase-type crystal structure of a titanium oxide crystal has higher intensity, and the higher intensity of the X-ray diffraction peak is 1.5% or less with respect to intensity of an X-ray diffraction peak showing a (111) plane of Li4Ti5O12 crystal.
8. The lithium rechargeable battery according to claim 4, wherein
the lithium titanate sintered body contains at least one kind of titanium oxide crystal grains having a rutile-type crystal structure and titanium oxide crystal grains having an anatase-type crystal structure, and
in an X-ray diffraction pattern of the lithium titanate sintered body, either one of an X-ray diffraction peak showing a (110) plane of the rutile-type crystal structure of a titanium oxide crystal, and an X-ray diffraction peak showing a (101) plane of the anatase-type crystal structure of a titanium oxide crystal has higher intensity, and the higher intensity of the X-ray diffraction peak is 1.5% or less with respect to intensity of an X-ray diffraction peak showing a (111) plane of Li4Ti5O12 crystal.

* * * * *